United States Patent [19]

Sugasawa

[11] Patent Number: 5,229,848
[45] Date of Patent: Jul. 20, 1993

[54] CIRCUIT FOR PROCESSING IMAGE SIGNALS READ OUT OF PICK-UP APPARATUS HAVING SOLID STATE IMAGE SENSING DEVICES ADOPTING SPATIAL PIXEL SHIFT

[75] Inventor: Masayuki Sugasawa, Tokyo, Japan

[73] Assignee: Ikegami Tsushinki Co., Ltd., Tokyo, Japan

[21] Appl. No.: 744,491

[22] Filed: Aug. 13, 1991

[30] Foreign Application Priority Data

Aug. 28, 1990 [JP] Japan .................................. 2-224249
Apr. 12, 1991 [JP] Japan .................................. 3-106452

[51] Int. Cl.⁵ ............................................. H04N 9/09
[52] U.S. Cl. .................................... 358/41; 358/50; 358/213.27; 358/483
[58] Field of Search .............. 358/41, 50, 213.27, 358/213.28, 44, 160, 21 R, 212, 209, 48, 52, 483, 482

[56] References Cited

U.S. PATENT DOCUMENTS

| | | | |
|---|---|---|---|
| 4,106,056 | 8/1978 | Nagumo | 358/50 |
| 4,220,977 | 9/1980 | Yamanaka | 358/41 |
| 4,281,339 | 7/1981 | Morishita | 358/52 |
| 4,599,640 | 7/1986 | Dischert | 358/41 |
| 4,989,100 | 1/1991 | Ishima | 358/483 |

FOREIGN PATENT DOCUMENTS

135300 3/1985 European Pat. Off. .

Primary Examiner—James J. Groody
Assistant Examiner—Sherrie Hsia
Attorney, Agent, or Firm—Spencer, Frank & Schneider

[57] ABSTRACT

A circuit for processing red, green and blue color signals read out of red, green and blue solid state image sensing devices, light receiving elements of the green solid state image sensing device are spatially shifted with respect to those of the red and blue solid state image sensing devices in a horizontal scanning direction by a half of a pitch of the arrangement of the light receiving elements, including red, green and blue channels, each having a correlation double sampling circuit, in which a color signal is sampled at feed-through and signal portions, thereof to derive two sample values and a difference between these sample values is derived as an output color signal. When the green color signal is sampled and held in the green channel, the sampling operation in the red and blue channels is inhibited by neutralizing sample values in these channels, and when the red and blue color signals are sampled and held in the red and blue channels, respectively, the sampling operation in the green channel is inhibited by neutralizing sample values. The frequency response of a brightness signal obtained by mixing the thus processed red, green and blue color signals does not become zero even if an object to be picked-up has a spatial frequency which is equal to the sampling frequency.

10 Claims, 12 Drawing Sheets

PRIOR ART

*PRIOR ART*

FIG.5A  Object
FIG.5B  SH-2
FIG.5C  SH-3
FIG.5D  Green Signal
FIG.5E  Red Signal
FIG.5F  Brightness Signal

FIG._12A Object
FIG._12B SH-2
FIG._12C SH-3
FIG._12D SH-4
FIG._12E SH-5
FIG._12F Green Signal
FIG._12G Red Signal
FIG._12H Brightness Signal

FIG.13

CIRCUIT FOR PROCESSING IMAGE SIGNALS READ OUT OF PICK-UP APPARATUS HAVING SOLID STATE IMAGE SENSING DEVICES ADOPTING SPATIAL PIXEL SHIFT

BACKGROUND OF THE INVENTION

Field of the Invention and Description of the Related Art

The present invention relates to a circuit for processing image signals read out of a pick-up apparatus having at least first and second solid state image sensing devices adopting a so-called spatial pixel shift, in which a number of light receiving elements of the first solid state image sensing device are spatially shifted with respect to light receiving elements of the second solid state image sensing device in a main scanning direction by a distance which is substantially equal to a half of a pitch of the arrangement of light receiving elements in the main scanning direction.

In the solid state image sensing device, a number of light receiving elements are spatially arranged independently from each other, so that the spatial sampling is performed. According to the Nyquist's sampling theorem, a spatial frequency of an image of an object which can be reproduced by a single solid state image sensing device is limited to a frequency range up to $f_c/2$, wherein $f_c$ is a horizontal clock frequency for reading signal charges stored in the solid state image sensing device. If a frequency range higher than $f_c/2$ is to be obtained, there is produced a noise signal due to the fact that higher frequency components are folded back toward a lower frequency band. In a three-plate-type color television camera, in order to attain a higher resolution, a solid state image sensing device for obtaining a green color signal is spatially arranged with respect to the remaining two solid state image sensing devices for producing red and blue color signals such that light receiving elements of the green image sensing device are shifted with respect to light receiving elements of the red and blue image sensing devices in the horizontal scanning direction by a distant which is substantially equal to a half of a pitch of the arrangement of the elements in the horizontal scanning direction. Such a method is generally called a spatial pixel shift.

Figure 1A:
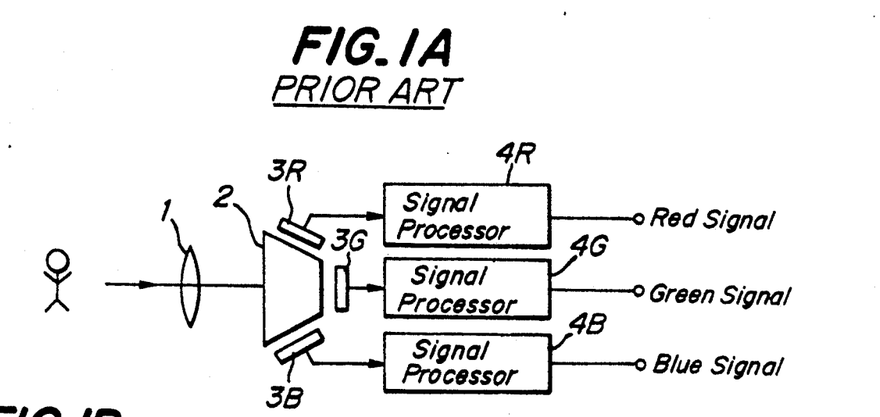
FIGS. 1A, 1B and 1C show the known color television camera utilizing the spatial pixel shift method.
Figure 1B:
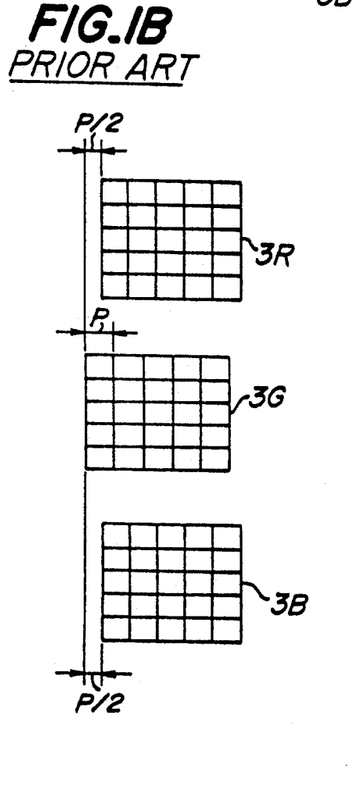
Figure 1C:
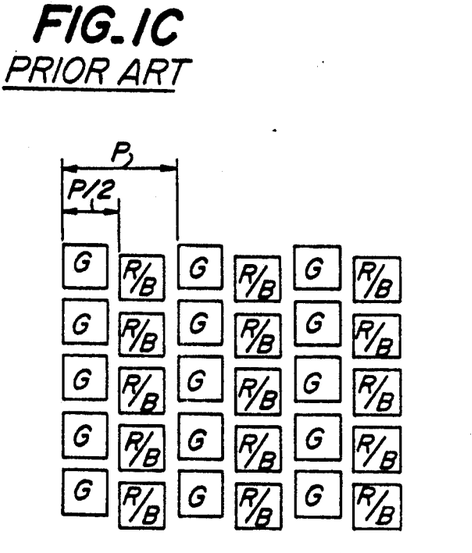

FIGS. 1A to 1C show a known solid state image pick-up apparatus in which the above mentioned spatial pixel shift method is adopted. Light from an object is made incident upon a color separation optical system 2 by means of an objective lens 1 and is divided into red, green and blue light, which are then made incident upon respective solid state image sensing devices 3R, 3G and 3B. As illustrated in FIG. 1B, pixels of the green image sensing device 3G are shifted with respect to those of the red and blue image sensing devices 3R and 3B in the main scanning direction by a half of a pitch P at which the pixels are arranged in the main scanning direction. When such a spatial pixel shift method is utilized, the image of the object is spatially sampled such that the red and blue pixels are positioned between successive green pixels as depicted in FIG. 1C. Therefore, when a brightness signal is produced by mixing the red, green and blue color signals, the number of pixels is apparently increased, and thus the resolution of the brightness signal becomes higher and the false signal can be decreased.

As explained above, in the spatial pixel shift method, the light receiving elements of the green image sensing device 3G are spatially shifted with respect to those of the red and blue image sensing devices 3R and 3B by P/2 in the main scanning direction. Therefore, prior to forming the brightness signal by mixing the color signals generated by these color image sensing devices, it is necessary to delay the green color signal with respect to the red and blue color signals by a time period corresponding to P/2, i.e. a half of a period of the signal reading clock in signal processors 4R, 4G and 4B.

Figure 2:
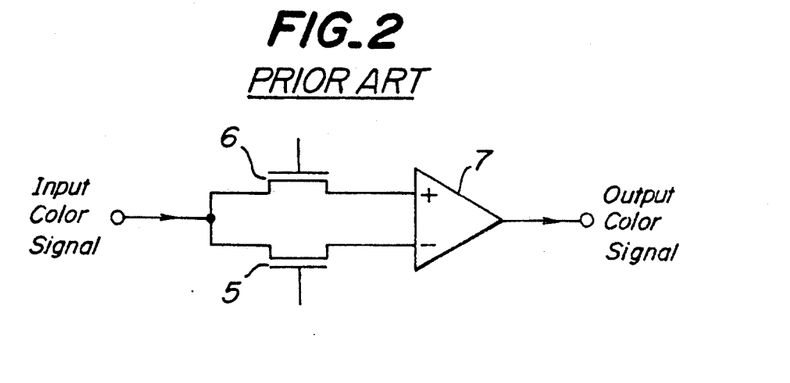
FIG. 2 is a circuit diagram illustrating the construction of the known correlation double sampling circuit.

Now a method of effecting the above delay will be explained for a known correlation double sampling method which has been widely used to remove reset noise and amp-noise from an output signal generated by CCD (Charge Coupled Device) which has been commonly utilized as the solid state image sensing device FIG. 2 shows the construction of the correlation double sampling circuit An input color signal read out of a solid state image sensing device is parallelly supplied to first and second sample and hold circuits 5 and 6. Output signals of the first and second sample and hold circuits 5 and 6 are then supplied to a differential amplifier 7.

Figures 3A, 3B:
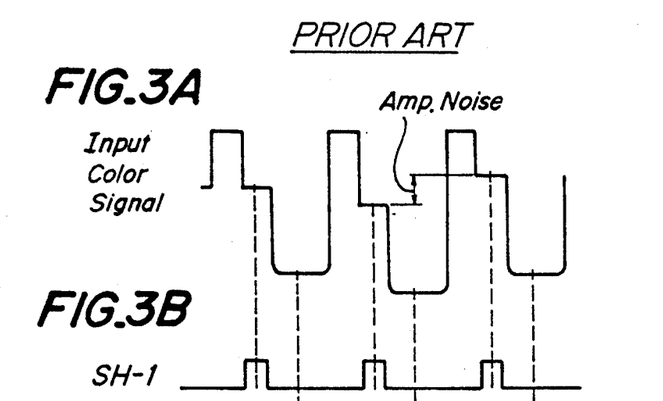
FIGS. 3A to 3D are signal waveforms for explaining the operation of the known correlation double sampling circuit shown in FIG. 2.
Figure 3C:
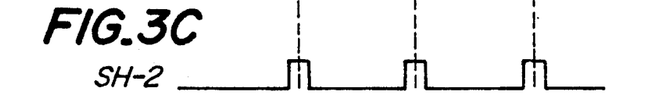

FIG. 3A depicts the input color signal. To the first sample and hold circuit 5 is supplied a first sampling signal SH-1 shown in FIG. 3B and the input color signal is sampled at a feed-through portion thereof. To the second sample and hold circuit 6 is supplied a second sampling signal SH-2 illustrated in FIG. 3C and the input color signal is sampled at a signal portion thereof. In this manner, the input color signal is sampled and held by the first and second sampling signals SH-1 and SH-2 at suitable timings and then a difference between these sample values is derived by the differential amplifier 7. In this manner, it is possible to derive the output color signal having high S/N without being influenced by reset noise and amp-noise.

Figure 4:
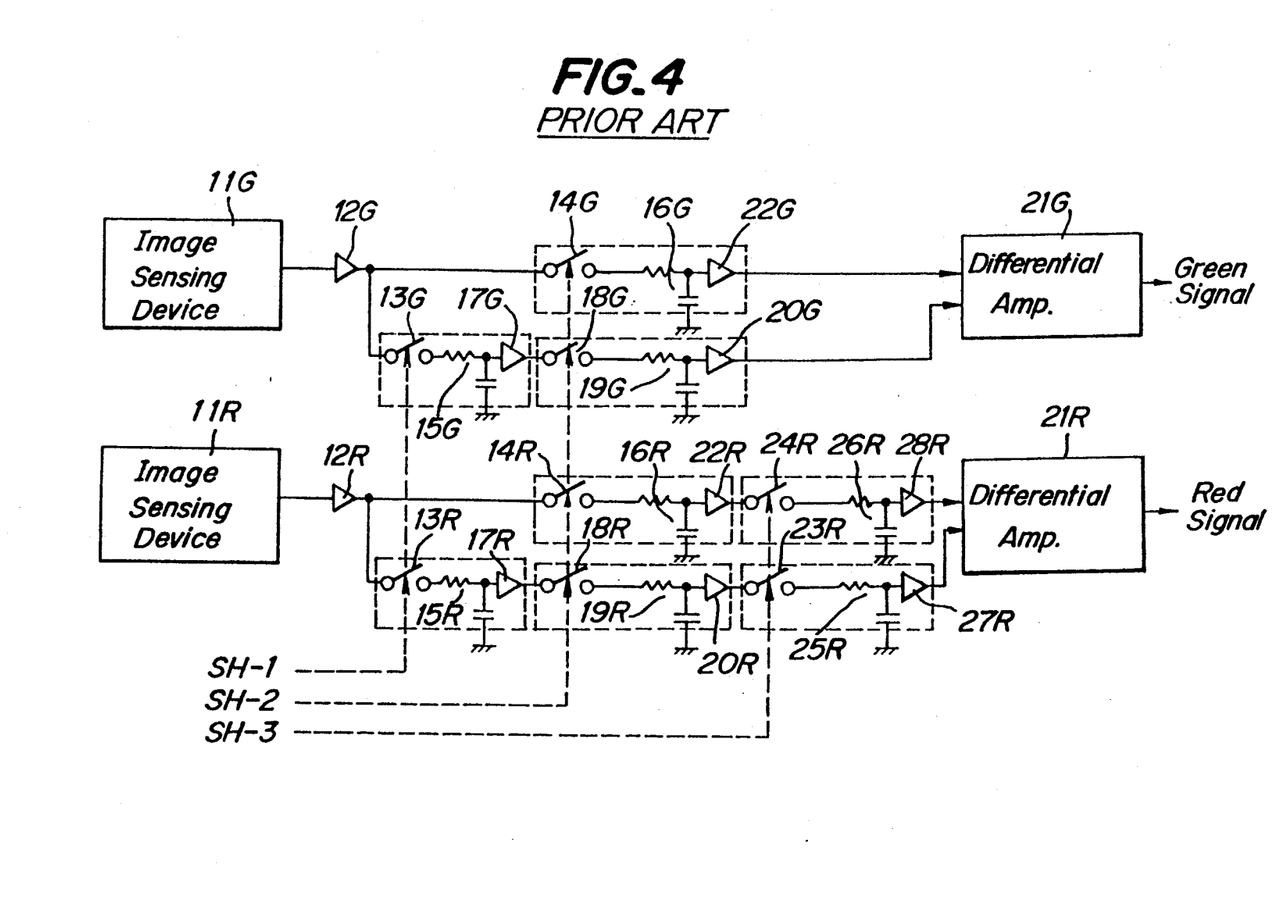
FIG. 4 is a circuit diagram showing the detailed construction of the known correlation double sampling circuit.

FIG. 4 shows the construction of the known correlation double sampling circuit. The green color signal read out of the green image sensing device 11G is amplified by a buffer amplifier 12G and is then parallelly supplied to first and second switches 13G and 14G. The first switch 13G is operated by the first sampling signal SH-1 shown in FIG. 3B and the green color signal generated from the green image sensing device 11G is sampled at the feed-through portion. The sampled signal is held in a first hold circuit 15G. The second switch 14G is driven by the second sampling signal SH-2 illustrated in FIG. 3C and the green color signal is sampled at the signal portion to derive a sample value which is stored in a second hold circuit 16G. The sample value held in the first hold circuit 15G is transferred via buffer amplifier 17G and third switch 18G to a third hold circuit 19G, and is further supplied via a buffer amplifier 20G to one input of a differential amplifier 21G. The sample value stored in the second hold circuit 16G is supplied via a buffer amplifier 22G to the other input of the differential amplifier 21G. The second and third switches 14G and 18G are driven by the second sampling signal SH-2. Therefore, the green color signal read out of the green image sensing device 11G is sampled at the signal portion to derive a sample value and the thus derived sample value is stored in the second hold circuit 16G. At the same time, the sample value at the feed-through portion is stored in the third hold circuit 19G. In this manner, the sample values representing the signal levels of the green color signal sampled at the feed-through portion and signal portion are simultaneously supplied to the differential amplifier 21G, and thus the differential amplifier produces an output green signal.

Figure 3D:
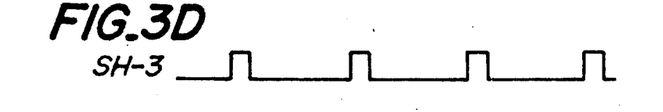

The red and blue color signals read out of the red and blue image sensing devices are processed in the entirely same manner, so that here only the processing circuit for the red color signal is shown in FIG. 4. In the red color signal processing circuit, portions similar to those of the green color signal processing circuit are denoted by the same reference numerals with R instead of G. As explained above, the light receiving elements of the red image sensing device 11R are spatially shifted with respect to those of the green image sensing device 11G in the main scanning direction by P/2, so that sampling timings for the red color signal have to be changed with respect to those for the green color signal. To this end, there are arranged switches 23R, 24R, hold circuits 25R, 26R and buffer amplifiers 27R, 28R. The switches 23R and 24R are driven by a third sampling signal SH-3 shown in FIG. 3D. The third sampling signal SH-3 is shifted with respect to the second sampling signal SH-2 by a half of the period of the clock pulses for reading the solid state image sensing devices. Therefore, the sample values stored in the hold circuits 16R and 19R are transferred into the hold circuits 25R and 26R, respectively at the timing of the third sampling signal SH-3, and are then supplied to the differential amplifier 21R by means of the buffer amplifiers 28R and 27R, respectively. In this manner, from the differential amplifier 21R there is derived an output red color signal which has been delayed with respect to the green color signal by a half of the clock period. The thus processed color signals are then supplied to succeeding stages and there are produced the brightness signal and color difference signals in a usual manner.

Figure 5A:
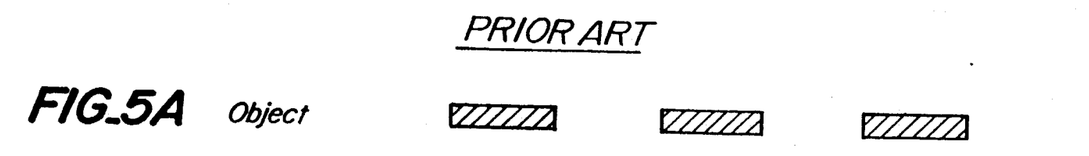
FIGS. 5A to 5F are schematic views for explaining the operation of the known correlation double sampling circuit.
Figure 5B:
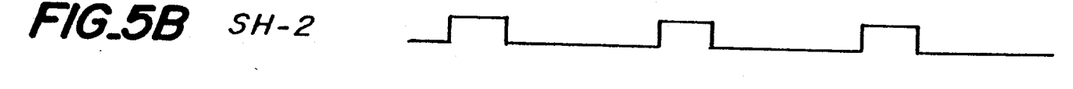
Figure 5C:
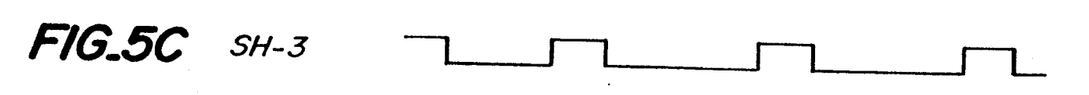
Figure 5D:
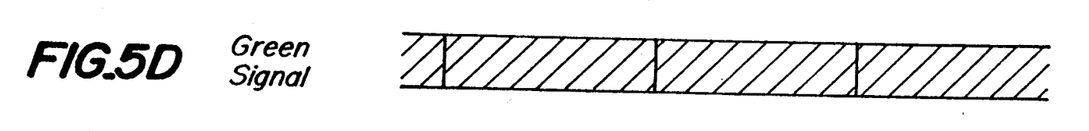
Figure 5E:
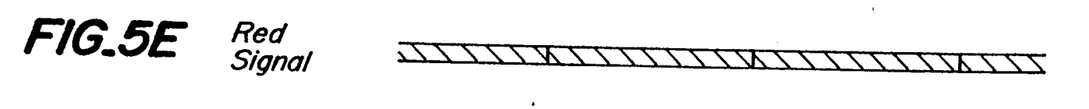
Figure 5F:
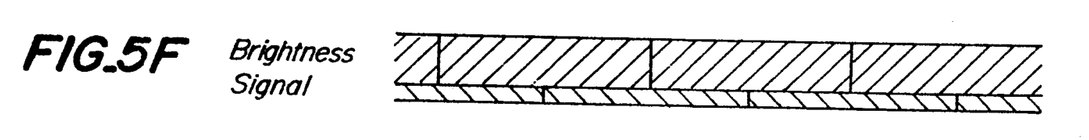

In the above mentioned known signal processing system, the frequency response of the brightness signal is decreased in proportion to the increase in the spatial frequency of the object, and when the spatial frequency becomes equal to the clock frequency for the solid state image sensing devices, the frequency response becomes zero. This will be further explained in detail with reference to FIGS. 5A to 5F. FIG. 5A illustrates the object having a regular repetition of bright portions and dark portions, and FIGS. 5B and 5C show the second and third sampling signals SH-2 and SH-3. When such an object is picked-up and the read out signal is processed by the known correlation double sampling circuit, each of the green and red signals lasts for a time interval between successive sampling points as shown in FIGS. 5D and 5E. Then, the frequency response of the brightness signal obtained by mixing the green, red and blue color signals with each other at a predetermined ratio becomes zero as shown in FIG. 5F.

SUMMARY OF THE INVENTION

The present invention has for its object to provide a novel and useful circuit for processing image signals read out of the pick-up apparatus including a plurality of solid state image sensing devices arranged by using the spatial pixel shift method, in which the frequency response does not become zero even when the spatial frequency of the object becomes comparable to the read out clock frequency, so that the maximum resolution of the brightness signal can be increased.

According to the invention, a circuit for processing image signals read out of a pick-up apparatus which includes at least first and second solid state image sensing devices, each having a number of light receiving elements arranged in matrix, the light receiving elements of the first solid state image sensing device being spatially shifted with respect to those of the second solid state image sensing device in a main scanning direction by a distance substantially equal to a half of a pitch of the arrangement of the light receiving elements in the main scanning direction, comprises:

a first sampling and holding means for sampling a first image signal read out of the first solid state image sensing device to derive sample values and holding the thus derived sample values of the first signal;

a second sampling means for sampling a second image signal read out of the second solid state image sensing device to derive sample values and holding the thus derived sample values of the second signal; and inhibiting means for inhibiting the operation of said first sampling means for a time period from a spatial sampling point at which said second image signal read out of said second solid state image sensing device is sampled by said second sampling means to a spatial sampling point at which said first image signal is sampled by said first sampling means, and for inhibiting the operation of said second sampling means for a time period from a spatial sampling point at which said first image signal is sampled by said first sampling means to a spatial sampling point at which said second image signal is sampled by said second sampling means.

According to the present invention, for a time period during which one of the first and second image signals is sampled, the sampling of the other image signal is inhibited, and thus when the brightness signal is derived by mixing the thus sampled signals with each other, the brightness signal reproduces the spatial frequency of the object faithfully and the resolution of the brightness signal becomes very high.

It should be noted that the present invention is most suitably applied to a color television camera having red, green and blue solid state image sensing devices, but the invention can be equally applied to a monochromatic television camera having at least two solid state image sensing devices

DESCRIPTION OF THE PREFERRED EMBODIMENTS

Figure 6:
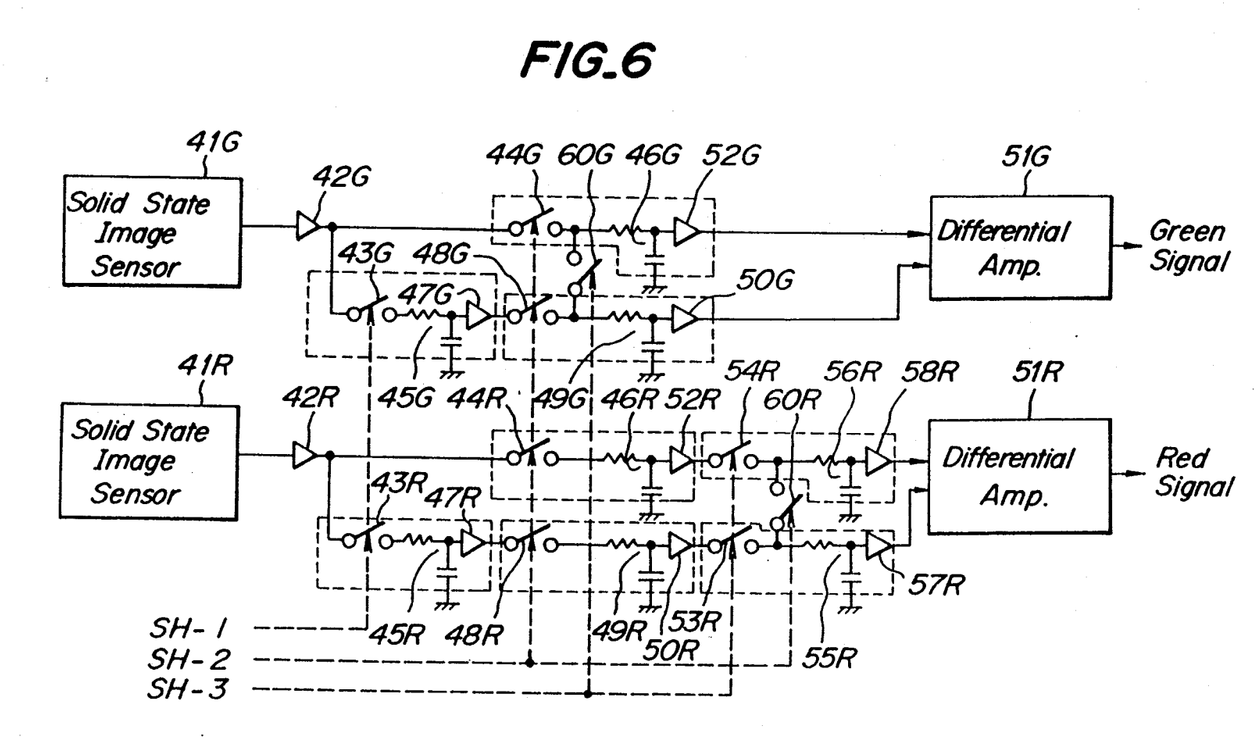
FIG. 6 is a circuit diagram depicting a first embodiment of the signal processing circuit according to the invention.

FIG. 6 is a circuit diagram showing a first embodiment of the signal processing circuit according to the invention. A green color signal read out of a green solid state image sensing device 41G is amplified by a buffer amplifier 42G and is then supplied to first and second switches 43G and 44G. The first switch 43G is driven by the first sampling signal SH-1 shown in FIG. 3B, and the green color signal read out of the solid state image sensing device 41G is sampled at the feed-through portion and a sample value thus obtained is stored in a first hold circuit 45G. The second switch 44G is operated by the second sampling signal SH-2 illustrated in FIG. 3C and a sample value is stored in a second hold circuit 46G. The sample value stored in the first hold circuit 45G is amplified by a buffer amplifier 47G and is then transferred via a third switch 48G to a third hold circuit 49G. The sample value held in the third hold circuit 49G is supplied via a buffer amplifier 50G to one input of a differential amplifier 51G. The sample value stored in the second hold circuit 46G is supplied via a buffer amplifier 52G to the other input of the differential amplifier 51G. The second and third switches 44G and 48G are driven by the second sampling signal SH-2 such that the green color signal read out of the solid state image sensing device 41G is sampled at the signal portion thereof and a sample value thus obtained is stored in the second hold circuit 46G. At the same time, the sample value obtained at the feed-through portion and stored in the first hold circuit 45G is transferred into the third hold circuit 49G and is stored therein. In this manner, to the inputs of the differential amplifier 51G are simultaneously supplied the first and second sample values obtained at the feed-through portion and signal portion of the input green color signal, respectively. In FIG. 6, the switches and hold circuits are shown separately, but in practice, they are formed by IC to constitute sample and hold circuits. In FIG. 6, respective sample and hold circuits are denoted by broken line blocks.

In the present embodiment, input sides of the second and third hold circuits 46G and 49G can be selectively short-circuited by means of a switch 60G. When the switch 60G is closed, the signal charges stored in the second and third hold circuits 46G and 49G can be neutralized. That is to say, the switch 60G is driven by the third sampling signal SH-3 shown in FIG. 3D such that the signal charges stored in the hold circuits 46G and 49G are neutralized for a time period during which the third sampling signal SH-3 assumes a higher level, so that the output signal of the differential amplifier 51G becomes zero for time period from the raising edge of the third sampling signal SH-3 to the raising edge of the second sampling signal SH-2.

Also in the present invention, the red and blue color signals are processed in the entirely same manner, so that only the signal processing circuit for the red color signal read out of a red image sensing device 41R is shown in FIG. 6. In the red channel, portions similar to those of the green channel are denoted by the same reference numerals with R instead of G. The light receiving elements of the green image sensing device 41G and those of the red image sensing device 41R are shifted with respect to each other by P/2 in order to perform the spatial pixel shift method, and therefore it is necessary to change the sampling timings for the red color signal with respect to those for the green color signal. To this end, there are provided fourth and fifth switches 53R and 54R, fourth and fifth hold circuits 55R and 56R and fourth and fifth buffer amplifiers 57R and 58R. The fourth and fifth switches 53R and 54R are driven by the third sampling signal SH-3 which is shifted with respect to the second sampling signal SH-2 by a time which is equal to a half of a period of the clock pulse for reading the image signal out of the solid state image sensing device. Therefore, the signal charges stored in the second and third hold circuits 46R and 49R are transferred into the fourth and fifth hold circuits 55R and 56R at the timing of the third sampling signal SH-3 and are stored therein. Then the signal charges stored in the fourth and fifth hold circuits 55R and 56R are supplied via the fourth and fifth buffer amplifiers 57R and 58R, respectively to the differential amplifier 51R which derives a difference therebetween to produce an output red color signal. In this manner, from the differential amplifier 51R there is derived the output red color signal which is shifted with respect to the green signal by the time equal to a half of the reading out clock period. It should be noted that this time corresponds to a half the pitch P of the arrangement of the light receiving elements in the main scanning direction.

In the present embodiment, between the input sides of the fourth and fifth hold circuits 55R and 56R is arranged a sixth switch 60R and this switch is driven by the second sampling signal SH-2. That is to say, the signal charges stored in the fourth and fifth hold circuits 55R and 56R are neutralized when the sixth switch 60R is closed and this condition is continued until the third sampling signal SH-3 is supplied. Therefore, the output of the differential amplifier 51R is kept zero for a time period from the raising edge of the second sampling signal SH-2 to the raising edge of the third sampling signal SH-3. In this manner, according to the present invention, when the sampling and holding operation is performed in the green channel, the holding operation is not conducted in the red and blue channels, and when the sampling and holding operation is carried out in the red and blue channels, the holding operation is inhibited in the green channel.

Figure 7A:
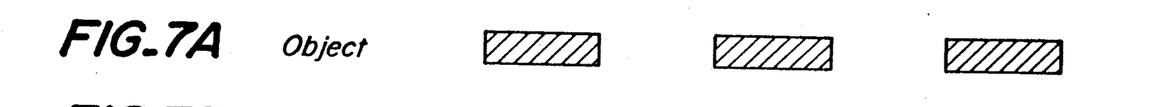
FIGS. 7A to 7F are schematic views for explaining the function of the circuit shown in FIG. 6.
Figure 7B:
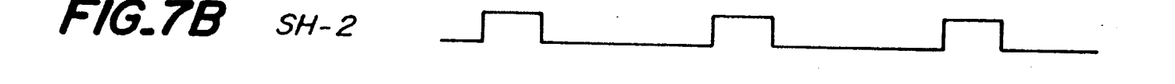
Figure 7C:
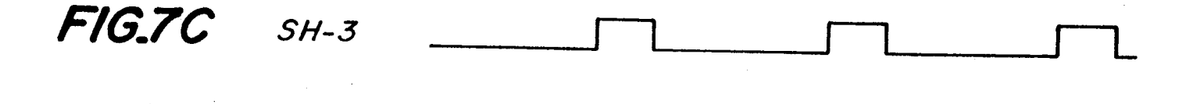
Figure 7D:
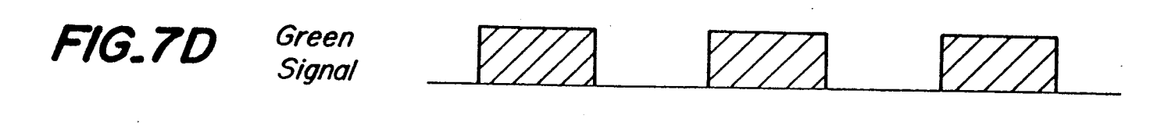
Figure 7E:
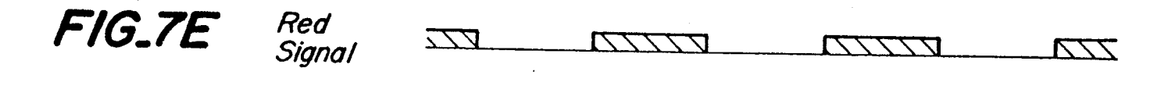
Figure 7F:
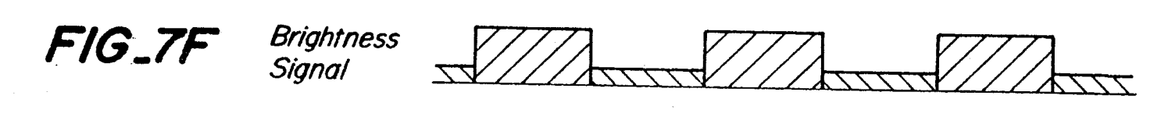

FIGS. 7A to 7F are schematic views for explaining the function of the signal processing circuit shown in FIG. 6. FIGS. 7A shows the bright and dark pattern of the object, and FIGS. 7B and 7C illustrate the second and third sampling signals SH-2 and SH-3. FIG. 7D depicts the output signal of the differential amplifier 51G in the green channel and is generated at the raising edge of the second sampling signal SH-2 and becomes zero at the raising edge of the third sampling signal SH-3. The red color signal derived from the red channel is raised at the raising edge of the third sampling signal SH-3 and becomes zero at the raising edge of the second sampling signal SH-2 as depicted in FIG. 7E. Therefore, the brightness signal obtained by mixing the green, red and blue color signals becomes as shown in FIG. 7F and can reproduce the pattern of the object faithfully.

Figure 8:
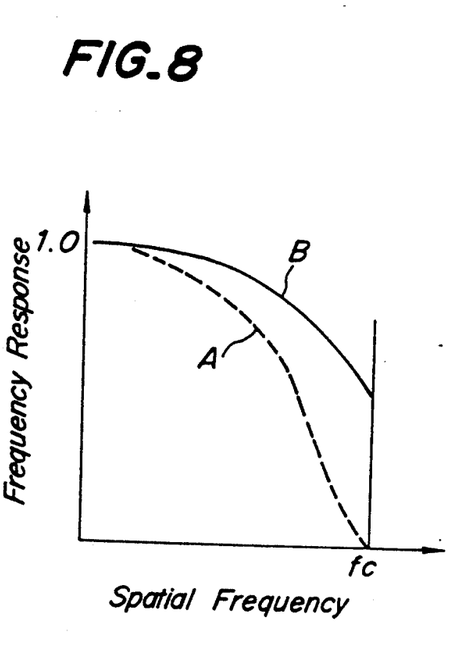
FIG. 8 is graph showing the frequency response of the circuit according to the invention.

FIG. 8 is a graph showing the frequency response of the signal processing circuit according to the invention and that of the known circuit. In the known circuit, the frequency response is abruptly decreased in accordance with the increase of the frequency and becomes zero at the clock frequency fC as illustrated by a broken curve A. However, in the circuit according to the invention, the frequency response is not decreased abruptly and does not become zero even at the clock frequency fC as shown by a solid curve B. Therefore, according to the invention, it is possible to improve the maximum resolution of the brightness signal to a great extent.

Figure 9:
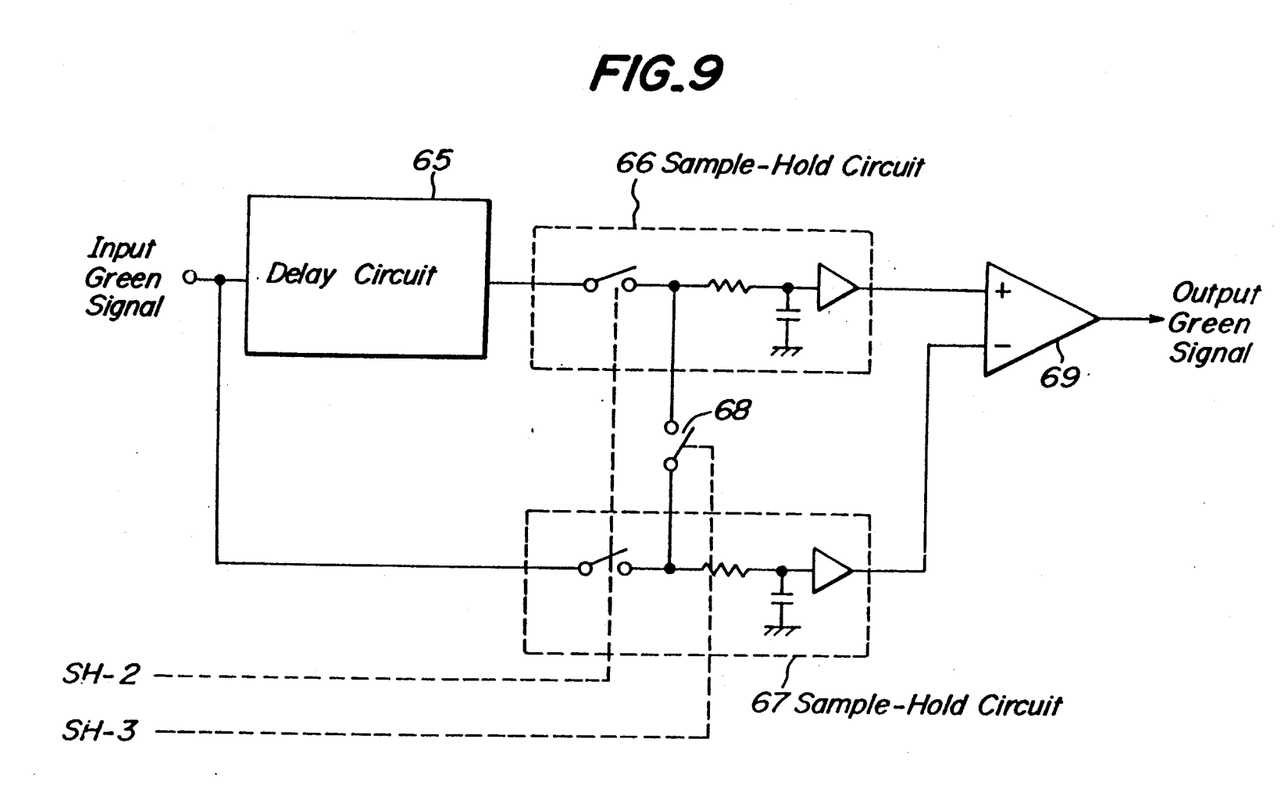
FIG. 9 is a circuit diagram illustrating a second embodiment of the signal processing circuit according to the invention.

FIG. 9 is a circuit diagram showing a second embodiment of the signal processing circuit according to the invention. In the first embodiment explained above, the correlation double sampling is performed by using the first to third sampling signals SH-1 to SH-3. In the present embodiment, the correlation double sampling is carried out by using a delay circuit to remove noise from the output signal generated by the solid state image sensing device The green color signal is supplied to a delay circuit 65 having a delay time which is equal to a time difference between the first and second sampling signals SH-1 and SH-2, and the delayed signal and non-delayed signals are supplied to sample and hold circuits 66 and 67, respectively, which are driven by the second sampling signal SH-2. Output signals from these sample and hold circuits 66 and 67 are supplied to a differential amplifier 69. Further the input sides of the sample and hold circuits 66 and 67 are selectively short-circuited by means of a switch 68 which is driven by the third sampling signal SH-3. When the switch 68 is closed by the third sampling signal SH-3, the green signal is held to zero for a time period during which the red and blue color signals are sampled and held. By selectively closing switches in the red and blue channels corresponding to the switch 68 in the green channel in accordance with the second sampling signal SH-2, the red and blue color signals are held zero for a time period during which the green color signal is sampled and held.

Figure 10:
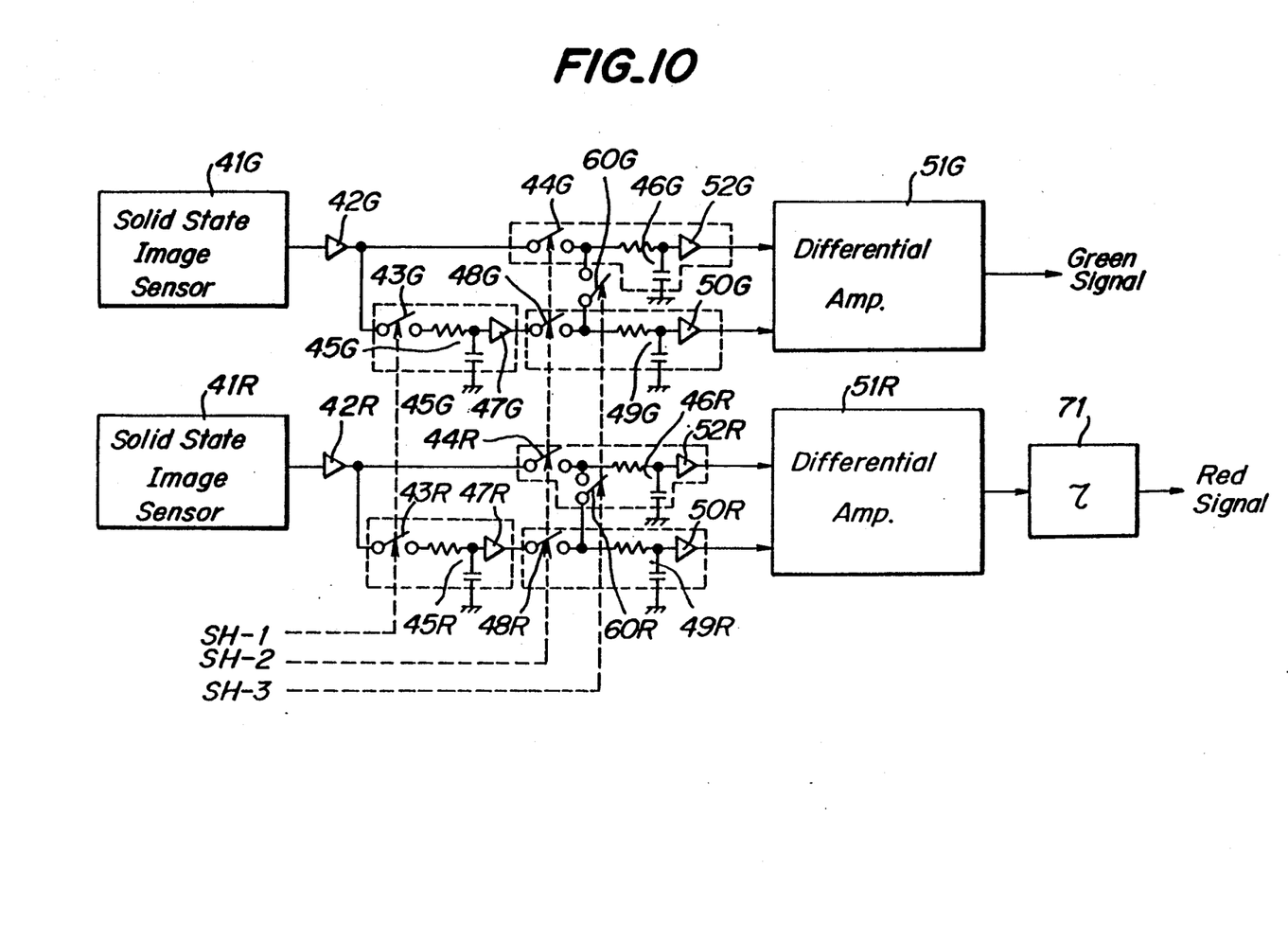
FIG. 10 is a circuit diagram depicting a third embodiment of the signal processing circuit according to the invention.

FIG. 10 is a circuit diagram showing a third embodiment of the the signal processing circuit according to the invention. Also in this embodiment, portions similar to those illustrated in FIG. 6 are denoted by the same reference numerals used in FIG. 6. In the first embodiment depicted in FIG. 6, the red color signal is delayed with respect to the green and blue color signals by the period corresponding to a half of the read-out clock period by means of the sample hold circuit 54R, 55R, 56R, 58R, 60R and the third sampling signal SH-3. In the present embodiment, an analog delay line 71 is provided at the output side of the differential amplifier 51R, said delay line having a delay time r equal to a half of the read-out clock period. In the third embodiment, the delay is not performed by the switching, so that it is possible to obtain the color signal with low noise. Moreover, since the correlation double sampling circuit can be utilized commonly for all the color channels, the cost of the signal processing circuit can be reduced.

Figure 11:
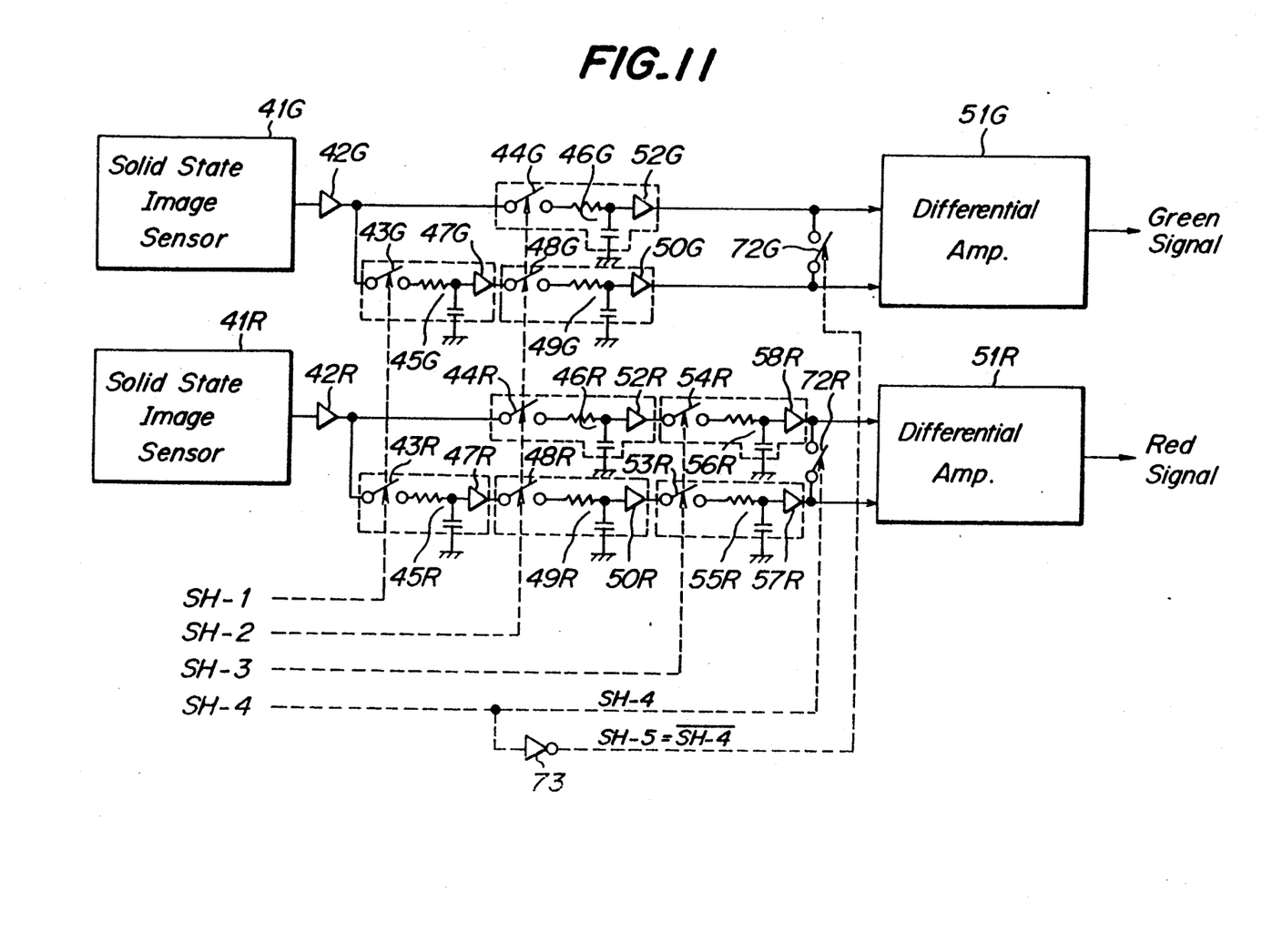
FIG. 11 is a circuit diagram showing a fourth embodiment of the signal processing circuit according to the invention.
Figure 12A:
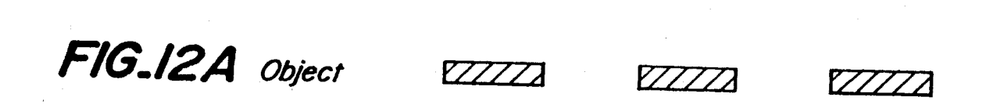
FIGS. 12A to 12H are schematic views for explaining the operation of the circuit illustrated in FIG. 11.
Figure 12B:
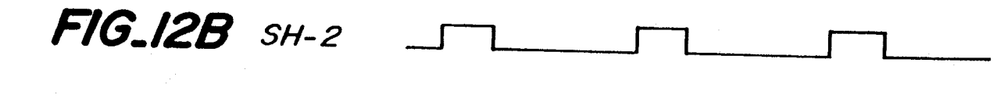
Figure 12C:
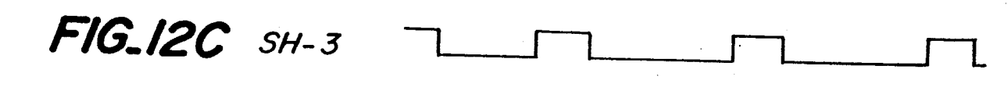
Figures 12D, 12E:
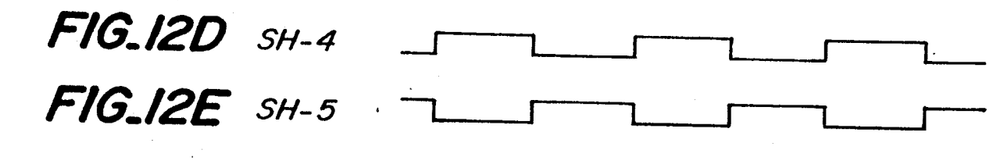
Figures 12F, 12G, 12H:
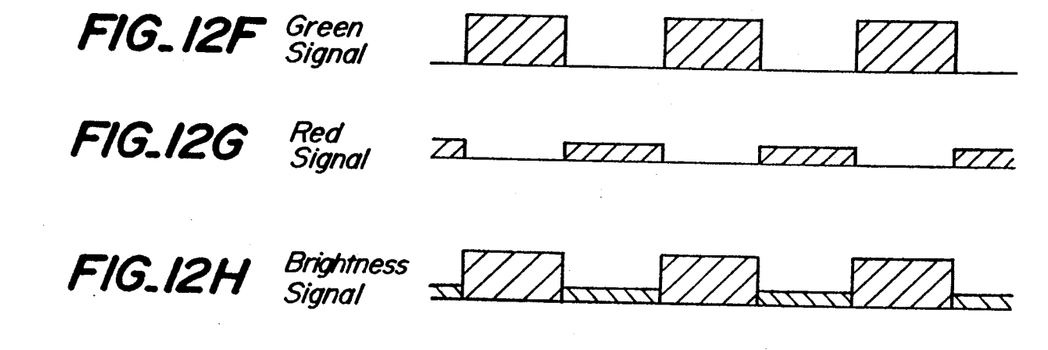

FIG. 11 is a circuit diagram illustrating a fourth embodiment of the signal processing circuit according to the present invention. Also in this embodiment, portions similar to those illustrated in FIG. 6 are denoted by the same reference numerals in FIG. 6. Between the outputs of the sample and hold circuits and the differential amplifiers 51G and 51R are provided switches 72G and 72R, respectively and these switches are driven by fourth and fifth sampling signals SH-4 and SH-5, respectively having the duty cycle of 50%. FIGS. 12A to 12H are signal waveforms for explaining the operation of the circuit shown in FIG. 11. As illustrated in FIGS. 12D and 12E, the fourth and fifth sampling signals SH-4 and SH-5 have the duty cycle of 50% and are in opposite phases. As depicted in FIG. 11, the fifth sampling signal SH-5 may be derived by passing the fourth sampling signal SH-4 through an inverter circuit 73. The switches 72R and 72G are driven by the fourth and fifth sampling signals SH-4 and SH-5, respectively.

It is also possible to drive the switches provided at the output sides of the sample and hold circuits by the second or third sampling signal SH-2 or SH-3, but in this case the resolution might be decreased to a large extent, because the duty cycle of these sampling signals is not equal to 50%.

Figure 13:
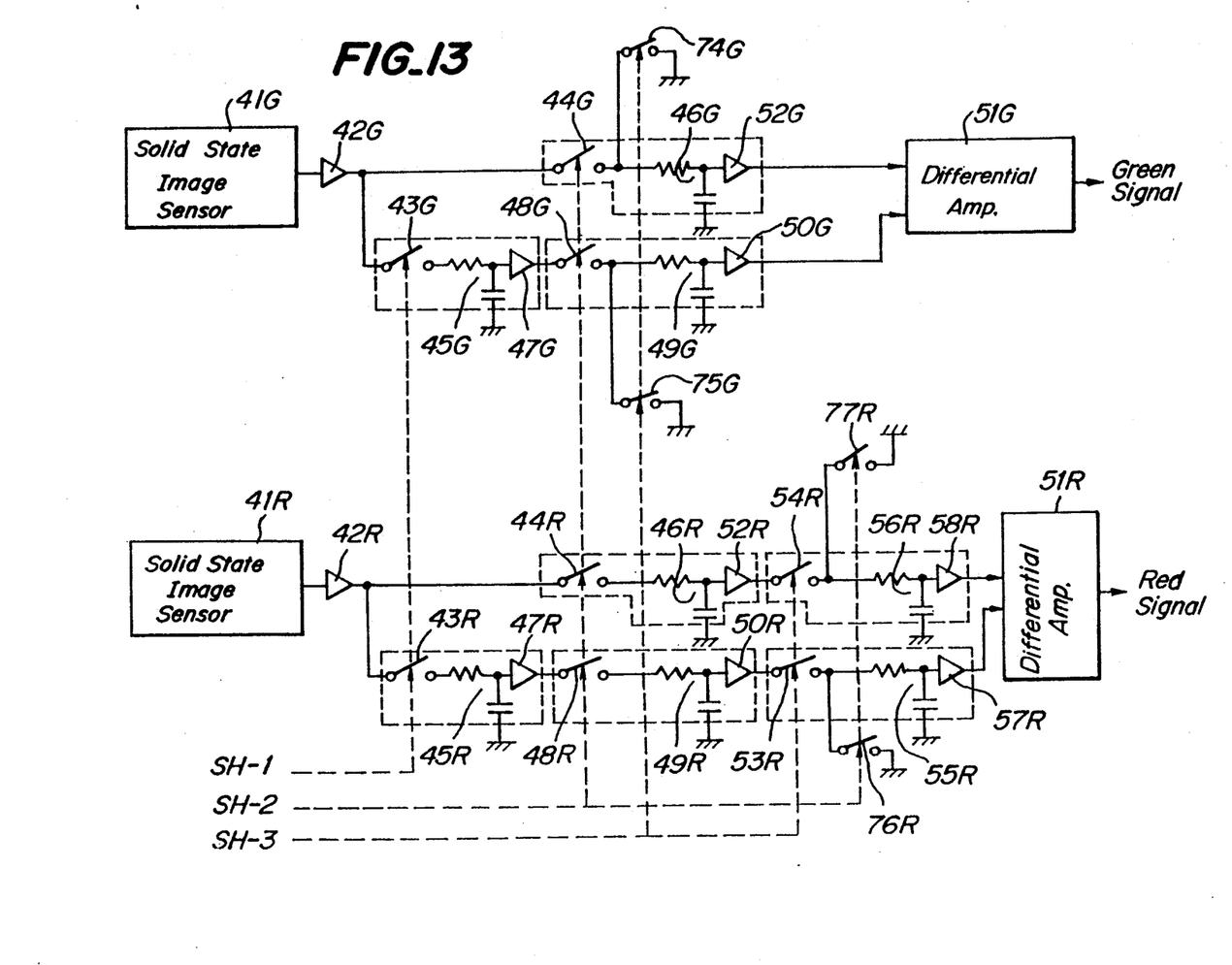
FIG. 13 is a circuit diagram showing a fifth embodiment of the signal processing circuit according to the invention.

FIG. 13 is a circuit diagram showing a fifth embodiment of the signal processing circuit according to the invention. In the present embodiment, portions similar to those shown in the first embodiment illustrated in FIG. 6 are represented by the same reference numerals used in FIG. 6. The neutralization of the signal charges are performed by short-circuiting the switches 44G and 48G by closing the switch 60G by the third sampling signal SH-3 and by short-circuiting the switches 53R and 54R by closing the switch 60R by the second sampling signal SH-2. In the present embodiment, the output sides of the switches 44G and 48G are connected via switches 74G and 75G to the same potential point such as a ground potential point and the output sides of the switches 53R and 54R are connected via switches 76R and 77R to the ground potential point. The switches 74G and 75G are driven by the third sampling signal SH-3 and the switches 76R and 77R are driven by the second sampling signal SH-2. In this manner, the circuit shown in FIG. 13 can operate in the same manner as that of the first embodiment illustrated in FIG. 6.

The present invention is not limited to the embodiments explained above, but many modifications and alternations may be conceived by those skilled in the art within the scope of the invention. For instance, in the above embodiments, the three primary color signals generated from the three-plate-type color television camera having the green, red and blue solid state image sensing devices are processed. According to the invention, it is also possible to process two brightness signals generated from a two-plate-type monochromatic television camera or six color signals produced by a six-plate-type color television camera having two green solid state image sensing devices, two red solid state image sensing devices and two blue solid state image sensing devices.

As explained above in detail, in the signal processing circuit according to the present invention, the output image signals read out of the solid state image sensing devices in which the spatial pixel shift method is adopted are processed such that when the output signal of a certain solid state image sensing device is sampled and held, the sampled and held signal of the other solid state image sensing device is forcedly made zero. Therefore, it is possible to obtain the very high frequency response even if the object having a high spatial frequency is picked-up, so that the maximum resolution can be increased to a greater extent. In the first, third and fifth embodiments in which the correlation double sampling is performed, the sampled and held value can be made zero by utilizing the sampling signal which is inherently required to effect the correlation double sampling. Therefore, it is no more necessary to prepare a separate sampling signal, and thus the circuit construction can be made simple and can be easily installed in the existent television camera. Further, it is possible to manage easily the pulse phase which is intimately related to the resolution of the pick-up apparatus, so that the merit of the present invention can be obtained most effectively.

Since the signal charges stored in the sample and hold circuits are neutralized by closing the switch for a short time period, the resolution of the pick-up apparatus is predominantly determined by the phase of the neutralizing pulse and is not affected by its duty cycle. Moreover, the non-inverted input and inverted input of the differential amplifier are short-circuited by the phase of the neutralizing pulse, the same phase rejection ratio of the differential amplifier can be made high and the output signal is hardly affected by the DC voltage variation due to surrounding noise and temperature variation of the circuit elements. Further the switching noise due to the on and off operation of the neutralizing switch can be removed at a very high ratio.

What is claimed is:

1. A circuit for processing image signals read out of a pick-up apparatus which includes at least first and second solid state image sensing devices, each having a number of light receiving elements arranged in a matrix, the light receiving elements of the first solid state image sensing device being spatially shifted with respect to those of the second solid state image sensing device in a main scanning direction by a distance substantially equal to a half of a pitch of the arrangement of the light receiving elements in the main scanning direction, comprising:

a first sampling and holding means for sampling a first image signal generated by the first solid state image sensing device to derive a sample value and holding the thus derived sample value of the first image signal;

a second sampling holding means for sampling a second image signal generated by the second solid state image sensing device to derive a sample value and holding the thus derived sample value of the second image signal; and inhibiting means for inhibiting the operation of said first sampling holding means for a time period from a spatial sampling point at which said second image signal read out of said second solid state image sensing device is sampled by said second sampling holding means to a spatial sampling point at which said first image signal is sampled by said first sampling means, and for inhibiting the operation of said second sampling holding means for a time period from a spatial sampling point at which said first image signal is sampled by said first sampling holding means to a spatial sampling point at which said second image signal is sampled by said second sampling holding means.

2. A circuit according to claim 1, wherein said first sampling and holding means is constructed such that said sample value of the first image signal is produced by sampling the first image signal at feed-through portion and signal portions thereof to derive first and second sample values and by deriving a difference between the thus derived first and second sample values, and said second sampling and holding means is constructed such that said sample value of the second image signal is produced by sampling the second image signal at feed-through portion and signal portion thereof to derive first and second sample values and by deriving a difference between the thus derived first and second sample values.

3. A circuit according to claim 2, wherein said first sampling and holding means comprises a first sample and hold circuit for sampling and holding the first image signal at a feed-through portion thereof in accordance with a first sampling signal to derive the first sample value, a second sample and hold circuit for sampling and holding the first image signal at a signal portion thereof in accordance with a second sampling signal to derive the second sample value, a third sample and hold circuit for sampling and holding said first sample value stored in said first sample and hold circuit in accordance with said second sampling signal, and a first differential amplifier for deriving a first difference between said first sample value supplied from said third sample and hold circuit and said second sample value supplied from said second sample and hold circuit;

said second sampling and holding means comprises a first sample and hold circuit for sampling and holding the second image signal at a feed-through portion thereof in accordance with the first sampling signal to derive the first sample value, a second sample and hold circuit for sampling and holding the second image signal at a signal portion thereof in accordance with the second sampling signal to derive the second sample value, a third sample and hold circuit for sampling and holding said first sample value stored in said first sample and hold circuit in accordance with said second sampling signal, a fourth sample and hold circuit for sampling and holding said first sample value stored in said third sample and hold circuit in accordance with a third sampling signal, a fifth sample and hold circuit for sampling and holding said second sample value stored in said second sample and hold circuit in accordance with said third sampling signal, and a second differential amplifier for deriving a second difference between said first sample value supplied from said fourth sample and hold circuit and said second sample value supplied from said fifth sample and hold circuit; and said inhibiting means comprises a first switching means connected in said first sampling and holding means such that said first and second sample values in the first sampling and holding means are neutralized when said second differential amplifier in the second sampling and holding means produces said second difference, and a second switching means connected in said second sampling and holding means such that said first and second sample values in the second sampling and holding means are neutralized when said first differential amplifier in the first sampling and holding means produces said first difference.

4. A circuit according to claim 3, wherein said first switching means comprises a first switch connected between input sides of said second and third sample and hold circuits in the first sampling and holding means, said first switch being driven by said third sampling signal, and said second switching means comprises a second switch connected between input sides of said fourth and fifth sample and hold circuits in the second sampling and holding means, said second switch being driven by said second sampling signal.

5. A circuit according to claim 3, wherein said first switching means comprises a first switch connected between output sides of said second and third sample and hold circuits in the first sampling and holding means, and said second switching means comprises a second switch connected between output sides of said fourth and fifth sample and hold circuits in the second sampling and holding means, said first and second switches being driven by fourth and fifth sampling signals which have a duty cycle of 50% and have opposite phases.

6. A circuit according to claim 3, wherein said first switching means comprises first and second switches connected between said second and third sample and hold circuits in the first sampling and holding means and the same potential point, respectively, said first and second switches being driven by said third sampling signal, and said second switching means comprises third and fourth switches connected between said fourth and fifth sample and hold circuits in the second sampling and holding means and the same potential point, respectively, said third and fourth switches being driven by said second sampling signal.

7. A circuit according to claim 2, wherein;
said first sampling and holding means comprises a delay circuit for delaying the first image signal by a time period which is equal to a time from the feed-through portion to the signal portion, a first sample and hold circuit for sampling the first image signal in accordance with a second sampling signal to derive a first sample value, a second sample and hold circuit for sampling a delayed first image signal supplied from said delay circuit in accordance with the second sampling signal to derive a second sample value, and a differential amplifier for deriving a first difference between said first and second sample values;
said second sampling and holding means comprises a first sample and hold circuit for sampling and holding the second image signal at a feed-through portion thereof in accordance with a first sampling signal to derive the first sample value, a second sample and hold circuit for sampling and holding the second image signal at a signal portion thereof in accordance with the second sampling signal to derive the second sample value, a third sample and hold circuit for sampling and holding said first sample value stored in said first sample and hold circuit in accordance with said second sampling signal, a fourth sample and hold circuit for sampling and holding said first sample value stored in said third sample and hold circuit in accordance with a third sampling signal, a fifth sample and hold circuit for sampling and holding said second sample value stored in said second sample and hold circuit in accordance with said third sampling signal, and a differential amplifier for deriving a second difference between said first sample value supplied from said fourth sample and hold circuit and said second sample value supplied from said fifth sample and hold circuit; and said inhibiting means comprises a first switching means connected in said first sampling and holding means such that said first and second sample values in the first sampling and holding means are neutralized when said differential amplifier in the second sampling and holding means produces said second difference, and a second switching means connected in said second sampling and holding means such that said first and second sample values in the second sampling and holding means are neutralized when said differential amplifier in the first sampling and holding means produces said first difference.

8. A circuit according to claim 7, wherein said first switching means comprises a first switch connected between said first and second sample and hold circuits in the first sampling and holding means, said first switch being driven by said third sampling signal; and said second switching means comprises a second switch connected between said fourth and fifth sample and hold circuits in the second sampling and holding means, said second switch being driven by said second sampling signal.

9. A circuit according to claim 2, wherein
said first sampling and holding means comprises a first sample and hold circuit for sampling and holding the first image signal at a feed-through portion thereof in accordance with a first sampling signal to derive the first sample value, a second sample and hold circuit for sampling and holding the first image signal at a signal portion thereof in accordance with a second sampling signal to derive the second sample value, a third sample and hold circuit for sampling and holding said first sample value stored in said first sample and hold circuit in accordance with said second sampling signal, and a first differential amplifier for deriving a first difference between said first sample value supplied from said third sample and hold circuit and said second sample value supplied from said second sample and hold circuit;
said second sampling and holding means comprises a first sample and hold circuit for sampling and holding the second image signal at a feed-through portion thereof in accordance with the first sampling signal to derive the first sample value, a second sample and hold circuit for sampling and holding the second image signal at a signal portion thereof in accordance with the second sampling signal to derive the second sample value, a third sample and hold circuit for sampling and holding said first sample value stored in said first sample and hold circuit in accordance with said second sampling signal, a second differential amplifier for deriving a second difference between said first sample value supplied from said third sample and hold circuit and said second sample value supplied from said second sample and hold circuit, and a delay line for delaying said second difference supplied from said second differential amplifier by a time period which is equal to a time difference between said feed-through portion and signal portion; and
said inhibiting means comprises a first switching means connected in said first sampling and holding means such that said first and second sample values in the first sampling and holding means are neutralized when said differential amplifier in the second sampling and holding means produces said second difference, and a second switching means connected in said second sampling and holding means such that said first and second sample values in the second sampling and holding means are neutralized when said differential amplifier in the first sampling and holding means produces said first difference.

10. A circuit according to claim 1, for processing red, green and blue color signals generated by red, green and blue solid state image sensing devices, respectively, wherein the green solar signal is processed by said first sampling and holding means, and the red and blue color signals are processed by said second sampling and holding means.

* * * * *